US012266884B2

(12) United States Patent
Hamai et al.

(10) Patent No.: US 12,266,884 B2
(45) Date of Patent: Apr. 1, 2025

(54) CONNECTOR INCLUDING FRONT HOLDER THAT IS UNLOCKED FROM HOUSING BY DISPLACING OPPOSITE SIDES TOWARD EACH OTHER

(71) Applicant: YAZAKI CORPORATION, Tokyo (JP)

(72) Inventors: Tsuyoshi Hamai, Makinohara (JP); Takatoshi Suzuki, Makinohara (JP); Junya Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 371 days.

(21) Appl. No.: 17/965,773

(22) Filed: Oct. 14, 2022

(65) Prior Publication Data

US 2023/0122390 A1 Apr. 20, 2023

(30) Foreign Application Priority Data

Oct. 19, 2021 (JP) ................................ 2021-171071

(51) Int. Cl.
*H01R 13/52* (2006.01)
*H01R 13/506* (2006.01)

(52) U.S. Cl.
CPC ....... *H01R 13/5202* (2013.01); *H01R 13/506* (2013.01)

(58) Field of Classification Search
None
See application file for complete search history.

(56) References Cited

U.S. PATENT DOCUMENTS

2014/0302711 A1* 10/2014 Suzuki ............... H01R 13/5202 439/556
2018/0277981 A1* 9/2018 Miura ...................... H02G 3/22
2019/0181585 A1* 6/2019 Schmidt ............ H01R 13/5202
2020/0381861 A1 12/2020 Tanaka et al.

FOREIGN PATENT DOCUMENTS

JP 2016-194976 A 11/2016
JP 2020-194645 A 12/2020

* cited by examiner

*Primary Examiner* — Oscar C Jimenez
(74) *Attorney, Agent, or Firm* — KENEALY VAIDYA LLP

(57) ABSTRACT

There is provided a connector including: a housing including a cylindrical wall portion; and a hollow annular front holder attached to the cylindrical wall portion to surround an outer periphery thereof. The front holder includes: a pair of first locking portions and a pair of operating portions arranged that are arranged to face with each other in a radial direction of the front holder. The connecter is configured such that: in a state where the front holder is fitted externally on the cylindrical wall portion, the pair of first locking portions is engaged with the cylindrical wall portion; and in response to an operation of displacing the pair of operating portions to approach with each other in the radial direction, the pair of first locking portions is displaced to release an engagement between the front holder and the cylindrical wall portion.

5 Claims, 8 Drawing Sheets

CONNECTOR INCLUDING FRONT HOLDER THAT IS UNLOCKED FROM HOUSING BY DISPLACING OPPOSITE SIDES TOWARD EACH OTHER

CROSS-REFERENCE TO RELATED APPLICATIONS

This application is based on and claims priority under 35 USC 119 from Japanese Patent Application No. 2021-171071 filed on Oct. 19, 2021, the contents of which are incorporated herein by reference.

TECHNICAL FIELD

The present disclosure relates to a connector including: a housing including a cylindrical wall portion constituting a fitting location with a mating part, and a hollow annular front holder attached to the cylindrical wall portion so as to surround an outer periphery of the cylindrical wall portion.

BACKGROUND ART

A related art describes a connector including: a housing that includes a cylindrical hood disposed so as to surround a terminal fitting, a packing that is externally fitted on the hood so as to seal a space between a mating part and a cylindrical wall portion, and a front holder that is attached to and engaged with the hood so as to prevent the packing from coming off (see, for example, JP2020-194645A).

In the connector of the type described above, the front holder may be separated from the hood for purposes such as packing replacement and connector recycling. However, in the above-described connector in the related art, due to a structure thereof, the hood must be separated from the front holder by releasing engagement between the hood and the front holder using a dedicated tool for releasing the engagement between the two. From the viewpoint of facilitating and improving efficiency of work of separating the front holder, it is desirable to be able to separate the front holder without using such a dedicated tool.

SUMMARY OF INVENTION

The present disclosure provides a connector in which a front holder can be separated without using a dedicated tool or the like.

According to an illustrative aspect of the present disclosure, a connector includes: a terminal fitting; an electric wire connected to the terminal fitting; a housing including a cylindrical wall portion that accommodates the terminal fitting and is provided with a location to be fitted with a mating part; a seal member disposed to surround an outer periphery of the cylindrical wall portion; a front holder having a hollow annular shape, being configured to prevent the seal member from coming off from the cylindrical wall portion and attached to the cylindrical wall portion to surround the outer periphery of the cylindrical wall portion. The front holder includes: a pair of first locking portions arranged to face with each other in a radial direction of the front holder and engageable with the cylindrical wall portion; and a pair of operating portions arranged to face with each other in the radial direction at positions different from the pair of first locking portions. The connecter is configured such that: in a state where the front holder is fitted externally on the cylindrical wall portion, the pair of first locking portions is engaged with the cylindrical wall portion; and in response to an operation of displacing the pair of operating portions to approach with each other in the radial direction, the pair of first locking portions is displaced to release an engagement between the front holder and the cylindrical wall portion.

The present disclosure has been briefly described as above. Details of the present disclosure will be further clarified by reading through modes for carrying out the present disclosure described below (hereinafter, referred to as "embodiments") with reference to the accompanying drawings.

DESCRIPTION OF EMBODIMENTS

Embodiment

Figure 1:
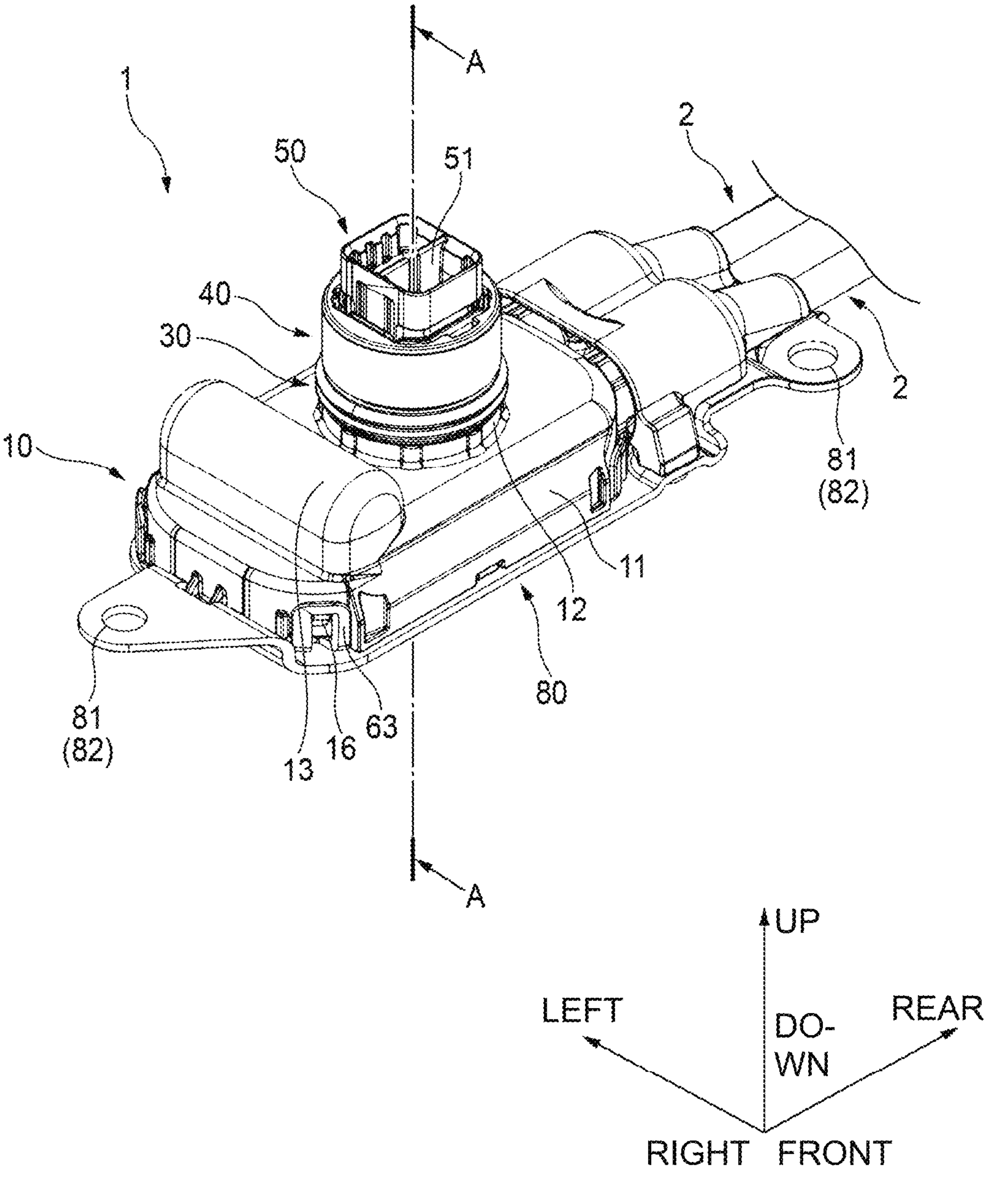
FIG. 1 is a perspective view showing a connector according to an embodiment of the present disclosure.

Hereinafter, a connector 1 according to an embodiment of the present disclosure will be described with reference to the drawings. The connector 1 shown in FIG. 1 functions as a relay connector that electrically connects a pair of electric wires 2 extending from a body portion 11 of a housing 10 and a mating part (not shown) including a fitted portion to be fitted to a fitting portion 12 of the housing 10. The mating part is, for example, an inverter (DC-AC converter) mounted on a vehicle, and one end portions of the pair of electric wires 2 extending from the body portion 11 are connected to, for example, an air conditioner mounted on the vehicle.

Hereinafter, for convenience of explanation, a "front-rear direction", an "up-down direction" and a "left-right direction" are defined as shown in FIGS. 1 to 8. The "front-rear direction", the "up-down direction" and the "left-right direction" are orthogonal to each other. The up-down direction coincides with a fitting direction of the fitting portion 12 and the fitted portion of the mating part.

The connector 1 includes the housing 10. The housing 10 is a resin molded product, and as shown in FIGS. 1 and 2, mainly includes the body portion 11, the fitting portion 12, and a convex portion 13 integrally.

As shown in FIG. 1 and the like, the body portion 11 has a substantially rectangular parallelepiped box shape extending in the front-rear direction. A substantially rectangular opening (not shown) is formed in a lower portion of the body portion 11 so as to communicate an internal space of the body portion 11 with outside in the up-down direction. This opening is liquid-tightly closed by a resin cover (not shown) attached with a rubber packing (not shown). A pressing plate

80 is provided to cover this cover. Various parts including a fuse (not shown) are accommodated in the internal space of the body portion 11.

Figure 2:
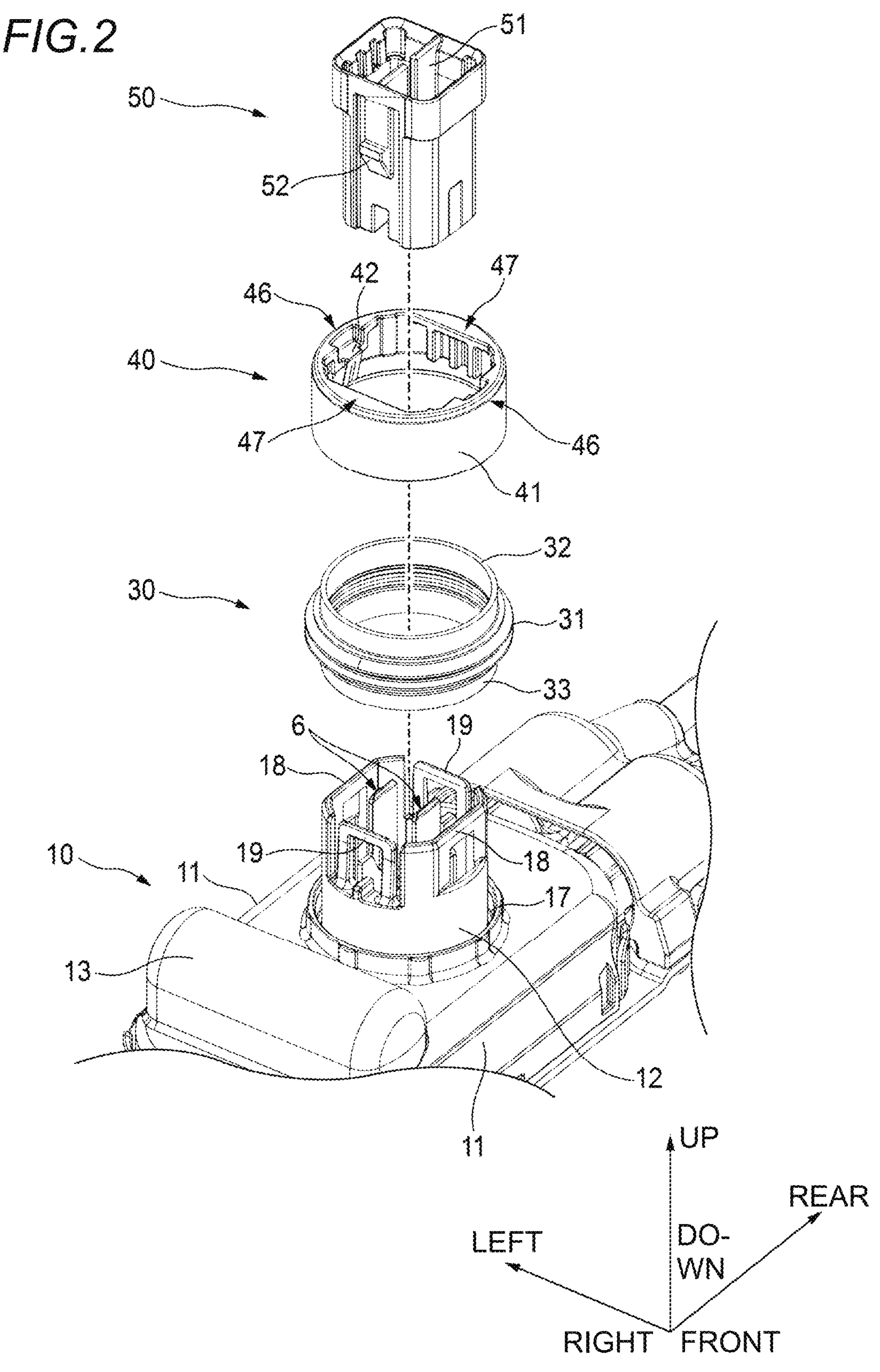
FIG. 2 is an exploded perspective view showing an exploded state of each part attached from above to a fitting portion of a housing in the connector shown in FIG. 1.

As shown in FIGS. 1 and 2, the fitting portion 12 is a substantially cylindrical portion that protrudes upward from a substantially central portion of an upper surface of the body portion 11, and is a portion that corresponds to a fitting location with the fitted portion of the mating part. As shown in FIG. 2, a packing 30, a front holder 40, and an inner housing 50 are attached to the fitting portion 12 in this order from above (see FIG. 2). Details of the packing 30, the front holder 40, and the inner housing 50 will be described later.

As shown in FIG. 1, the convex portion 13 is a portion including an upper surface protruding upward and a lower surface recessed upward at a front end portion of an upper wall of the body portion 11. In this example, the convex portion 13 has a semi-cylindrical shape that protrudes upward and extends in the left-right direction. In other words, in the convex portion 13, a part of the upper wall (outer wall) of the body portion 11 is curved so as to protrude upward, thereby forming a hollow portion below the curved part. Note that a thickness of the upper wall (outer wall) of the body portion 11 at such a curved place is substantially constant. The convex portion 13 is a portion that functions to accommodate the fuse (not shown) described above.

Figure 4:
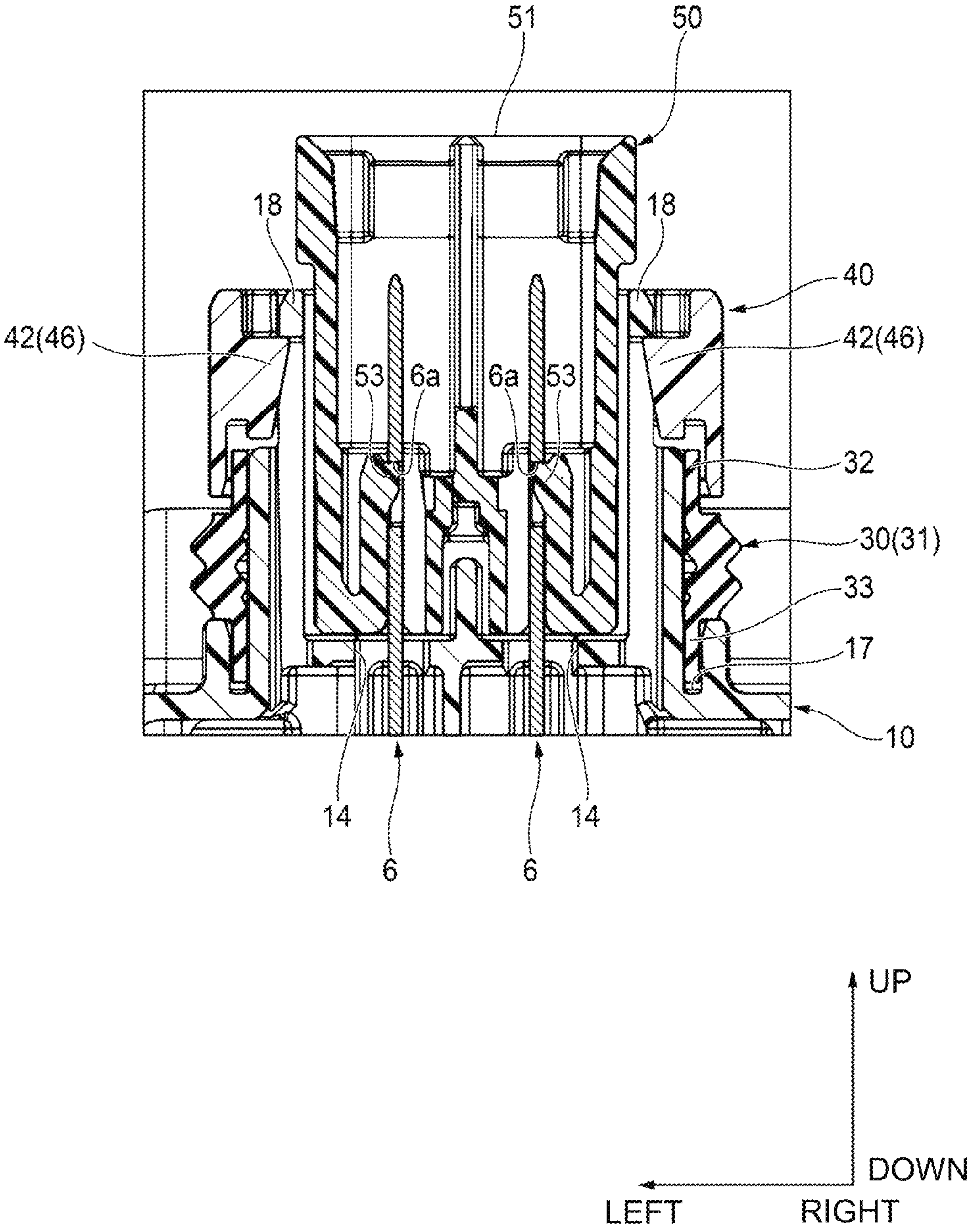
FIG. 4 is a cross-sectional view of the fitting portion of the housing taken along a line B-B in FIG. 3.
Figure 5:
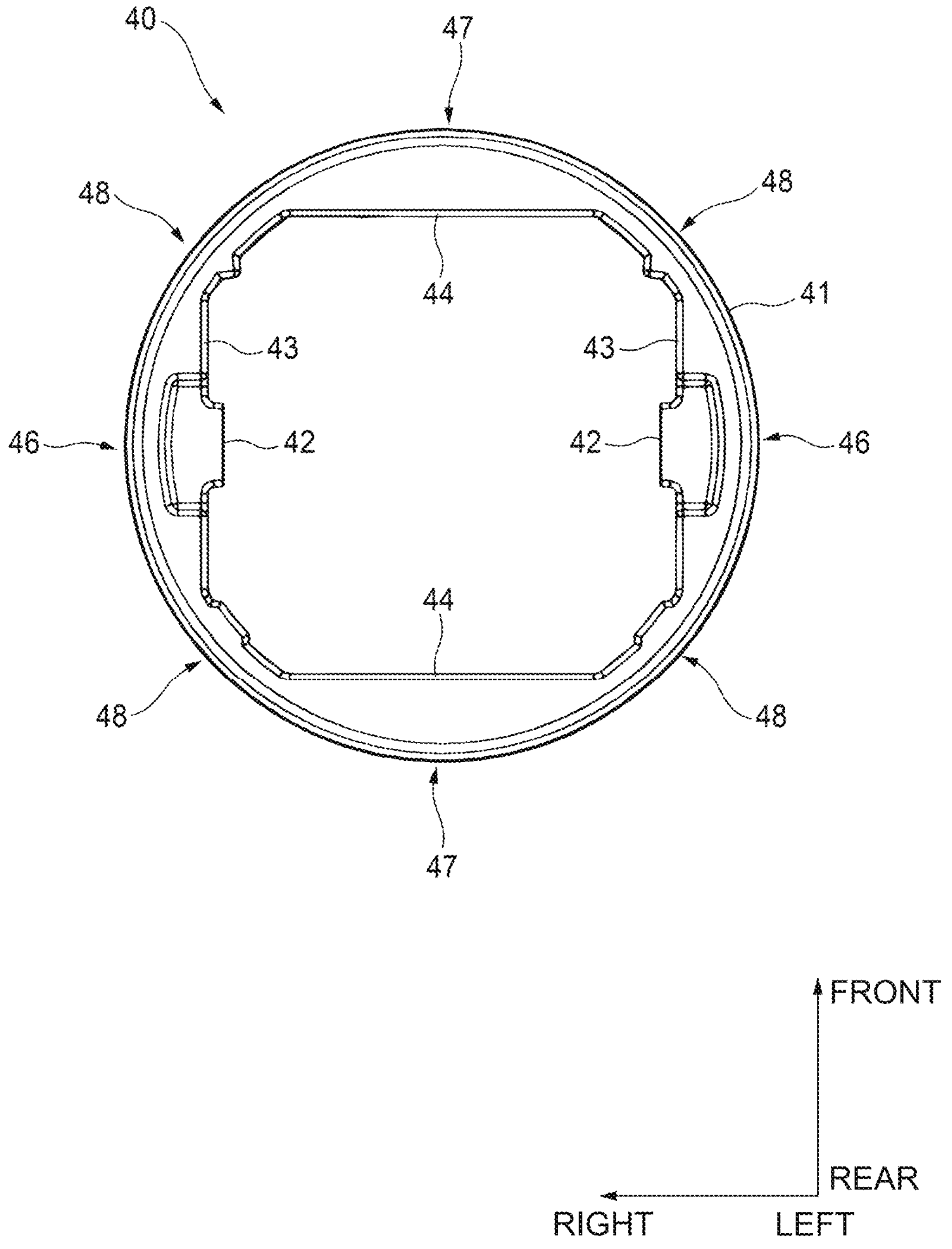
FIG. 5 is a top view of a front holder.
Figure 6:
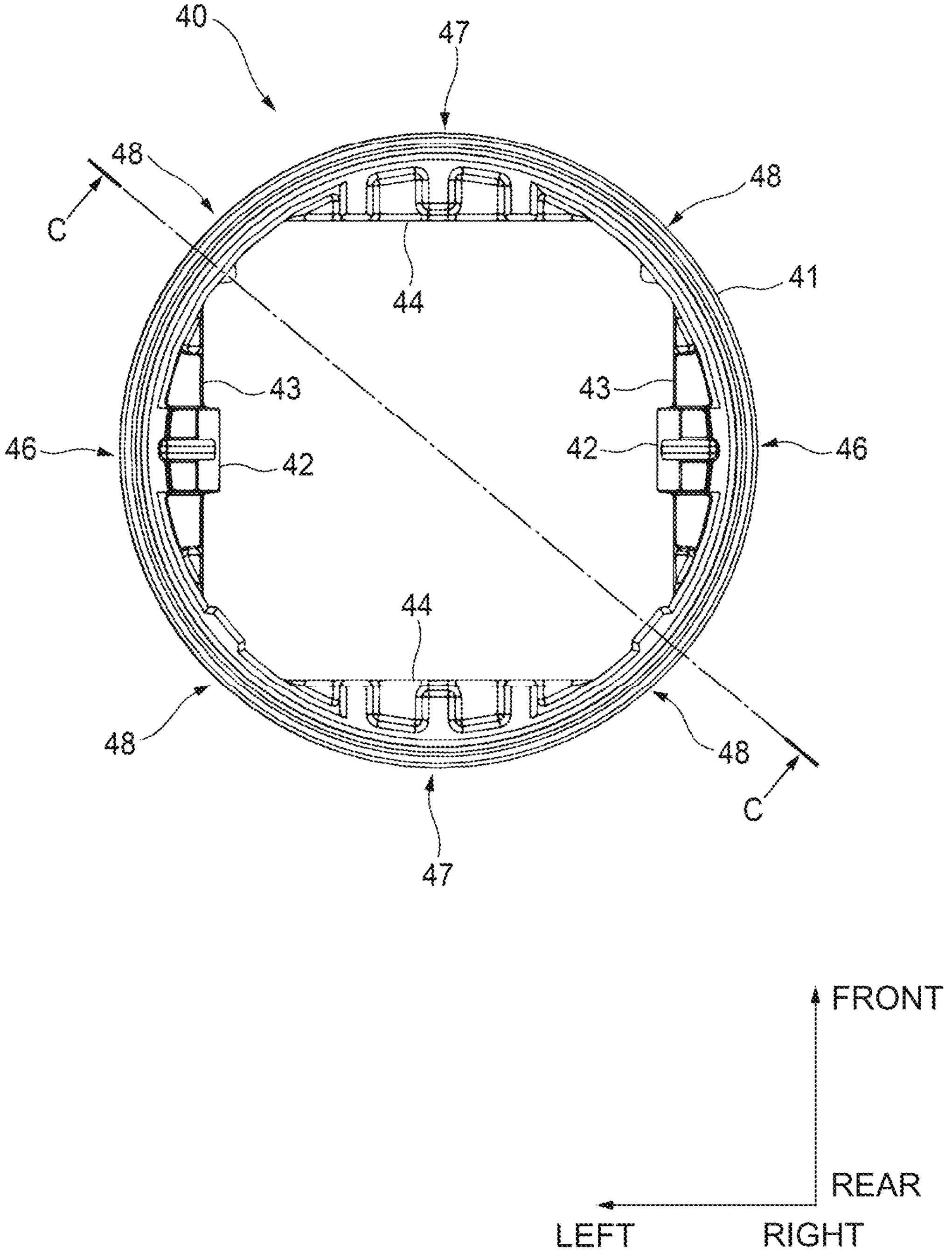
FIG. 6 is a bottom view of the front holder.

A pair of terminal insertion holes 14 are formed at a position corresponding to the fitting portion 12 on the upper wall of the body portion 11 of the housing 10 so as to be spaced apart in the left-right direction and communicate the internal space of the body portion 11 and an interior of the fitting portion 12 in the up-down direction (see FIG. 4). A pair of terminals 6 are inserted from below into the pair of terminal insertion holes 14 (see also FIG. 2).

A pair of electric wire insertion holes (not shown) are formed on a rear wall of the body portion 11 of the housing 10 so as to be spaced apart in the left-right direction and communicate the internal space of the body portion 11 with the outside in the front-rear direction. The pair of electric wires 2 extending from the housing 10 to the outside are respectively inserted through the pair of electric wire insertion holes (see also FIG. 1).

As shown in FIG. 1, a locking projection 16 is provided at each one of four corner portions on an outer peripheral side surface of the body portion 11 of the housing 10. The locking projection 16 functions to hold the cover (not shown) to the housing 10 by engaging with a locking frame portion 63 of the cover (not shown).

Next, details of the fitting portion 12 of the housing 10, and details of the packing 30, the front holder 40, and the inner housing 50 attached to the fitting portion 12 from above will be described in order with reference to FIG. 2.

First, the fitting portion 12 will be described. An annular groove portion 17 that is open upward and recessed downward is formed around a base portion of the substantially cylindrical fitting portion 12 that protrudes from the upper wall of the body portion 11 of the housing 10 (see FIGS. 2 to 4). A lower edge portion 33, which will be described later, of the packing 30 is accommodated in the annular groove portion 17 (see FIGS. 3 and 4). The fitting portion 12 accommodates the terminals 6 inserted through the terminal insertion holes 14 from below as described above (see FIG. 2).

As shown in FIG. 2, a pair of flat plate-like portions 18 formed with through holes is formed on both end portions of an upper region of the substantially cylindrical fitting portion 12 in the left-right direction, respectively, so as to face with each other in the left-right direction and extend in the front-rear direction. A pair of locking frame portions 19 is formed on both end portions of the upper region of the substantially cylindrical fitting portion 12 in the front-rear direction, respectively, so as to face with each other in the front-rear direction and extend in the left-right direction. Each locking frame portion 19 has a cantilever shape with an upper end as a free end, and is elastically deformable in the front-rear direction.

Figure 3:
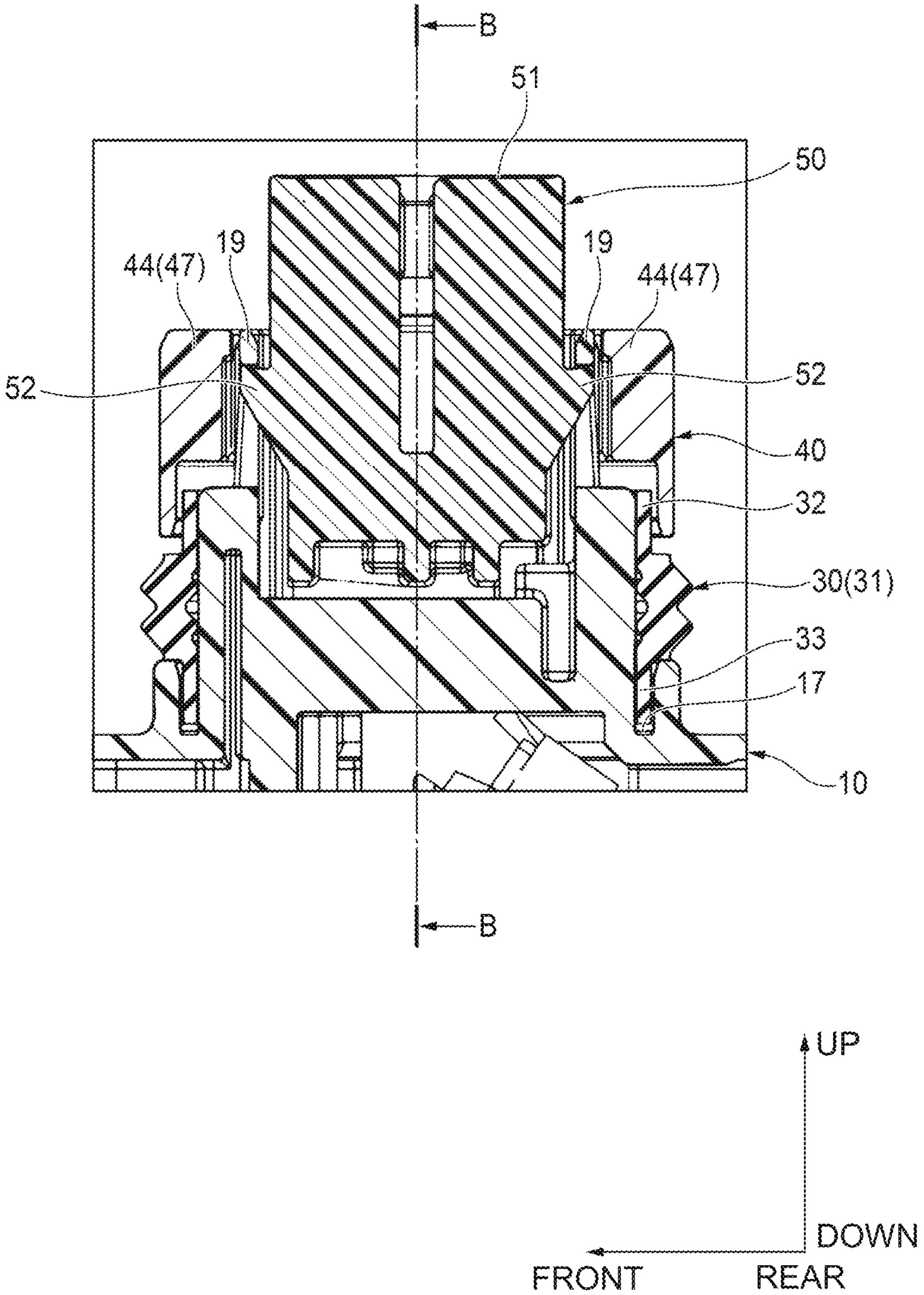
FIG. 3 is a cross-sectional view of the fitting portion of the housing taken along a line A-A in FIG. 1.

The through holes of the pair of flat plate-like portions 18 function to lock the front holder 40 (see FIG. 4), and the pair of locking frame portions 19 function to lock the inner housing 50 (see FIG. 3). By providing the pair of flat plate-like portions 18 and the pair of locking frame portions 19, an upper end portion of the fitting portion 12 has a substantially rectangular shape when viewed from above (see FIG. 2).

Next, the packing 30 will be described. The packing 30 is a rubber seal member having a substantially cylindrical shape. The packing 30 functions to seal a gap between an outer periphery of the fitting portion 12 and an inner periphery of the fitted portion of the mating part to be fitted with the fitting portion 12.

The packing 30 includes a cylindrical body portion 31 formed with annular lip portions on the inner periphery and outer periphery sides, a cylindrical upper edge portion 32 extending upward from the body portion 31, and a cylindrical lower edge portion 33 extending downward from the body portion 31. The packing 30 is externally fitted on the fitting portion 12 from above and thus attached to fitting portion 12 so that the lower edge portion 33 is accommodated in the annular groove portion 17 and closely adheres to an outer periphery (a cylindrical lower region) of the fitting portion 12.

Next, the front holder 40 will be described. The front holder 40 is a resin molded product, and is disposed adjacent to the packing 30 to prevent the packing 30 from coming off (upwardly) from the fitting portion 12. As shown in FIG. 2 and the like, the front holder 40 has a hollow annular shape as a whole. The front holder 40 includes a cylindrical body portion 41.

Figure 7:
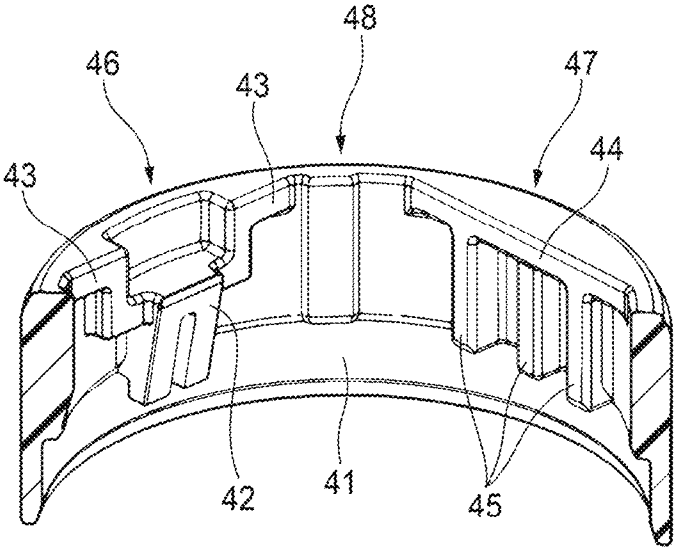
FIG. 7 is a perspective view of a cross section taken along a line C-C in FIG. 6.
Figure 7:
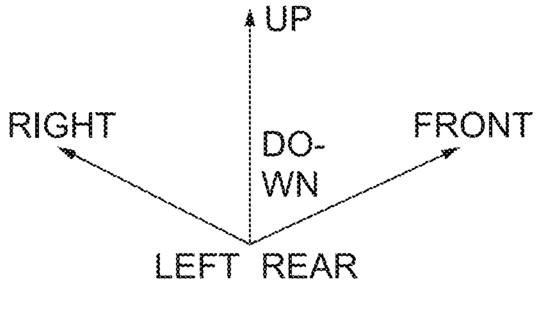

As shown in FIGS. 2, 4, 7, and the like, the body portion 41 includes a pair of engaging projections 42 protruding from an annular inner surface, which is formed at left and right end positions in a circumferential direction, respectively. The pair of engaging projections 42 are engaged with the through holes of the pair of flat plate-like portions 18 (see FIG. 2) of the fitting portion 12 of the housing 10 (see FIG. 4). On both sides in the circumferential direction of each engaging projection 42, extending portions 43 are formed to protrude from the annular inner surface of the body portion 41 and extend from the engaging projections 42 toward both sides in the circumferential direction along an upper edge of the body portion 41 (see FIG. 7). A protruding end surface of the extending portion 43 is a flat surface extending in the front-rear direction (see FIGS. 5 to 7).

As shown in FIGS. 3 and 7, at both front and rear end positions in the circumferential direction of an upper end portion of the body portion 41, first rib portions 44 are formed respectively to protrude from the annular inner surface and extend toward both sides in the circumferential direction along an upper edge of the body portion 41. On a lower side of each first rib portion 44, a plurality of (three) second rib portions 45 are formed to protrude from different positions of the annular inner surface in the circumferential direction of the body portion 41 and extend downward (that is, in an axial direction of an annulus) from the first rib portion 44 (see FIG. 7). A protruding end surface of the first rib portion 44 is a flat surface extending in the left-right direction (see FIGS. 5 to 7).

Hereinafter, as shown in FIG. 7, in the body portion 41, a circumferential region in which the engaging projections 42 and the extending portions 43 are provided (substantially, a circumferential region in which the extending portions 43 extend in the circumferential direction) is referred to as a "locking portion 46", a circumferential region in which the first rib portions 44 and the second rib portions 45 are provided (substantially, a circumferential region in which the first rib portions 44 extend in the circumferential direction) is referred to as an "operating portion 47", and an area connecting the locking portion 46 and the operating portion 47 adjacent to each other in the circumferential direction is referred to as a "connecting portion 48".

By providing the front holder 40 with the pair of locking portions 46 (particularly the extending portions 43) and the pair of operating portions 47 (particularly the first rib portions 44) as described above, as shown in FIG. 5, an upper end opening of the front holder 40 has a substantially rectangular shape corresponding to a shape of the upper end portion of the fitting portion 12 (see FIG. 2). The pair of locking portions 46 correspond to two sides of the substantially rectangular shape that face with each other in the left-right direction, the pair of operating portions 47 correspond to two sides of the substantially rectangular shape that face with each other in the front-rear direction, and the four connecting portions 48 correspond to four corners of the substantially rectangular shape.

A rigidity of the locking portion 46 is higher than that of the connecting portion 48 since the locking portion 46 is provided with the engaging projection 42 and the extending portion 43. Similarly, since the operating portion 47 is provided with the first rib portion 44 and the second rib portion 45, a rigidity of the operating portion 47 is higher than that of the connecting portion 48. In other words, a rigidity of a predetermined portion (that is, the locking portion 46, the operating portion 47, and the connecting portion 48) in the circumferential direction of the front holder 40 increases as a thickness of the predetermined portion in the radial direction increases.

Figure 8:
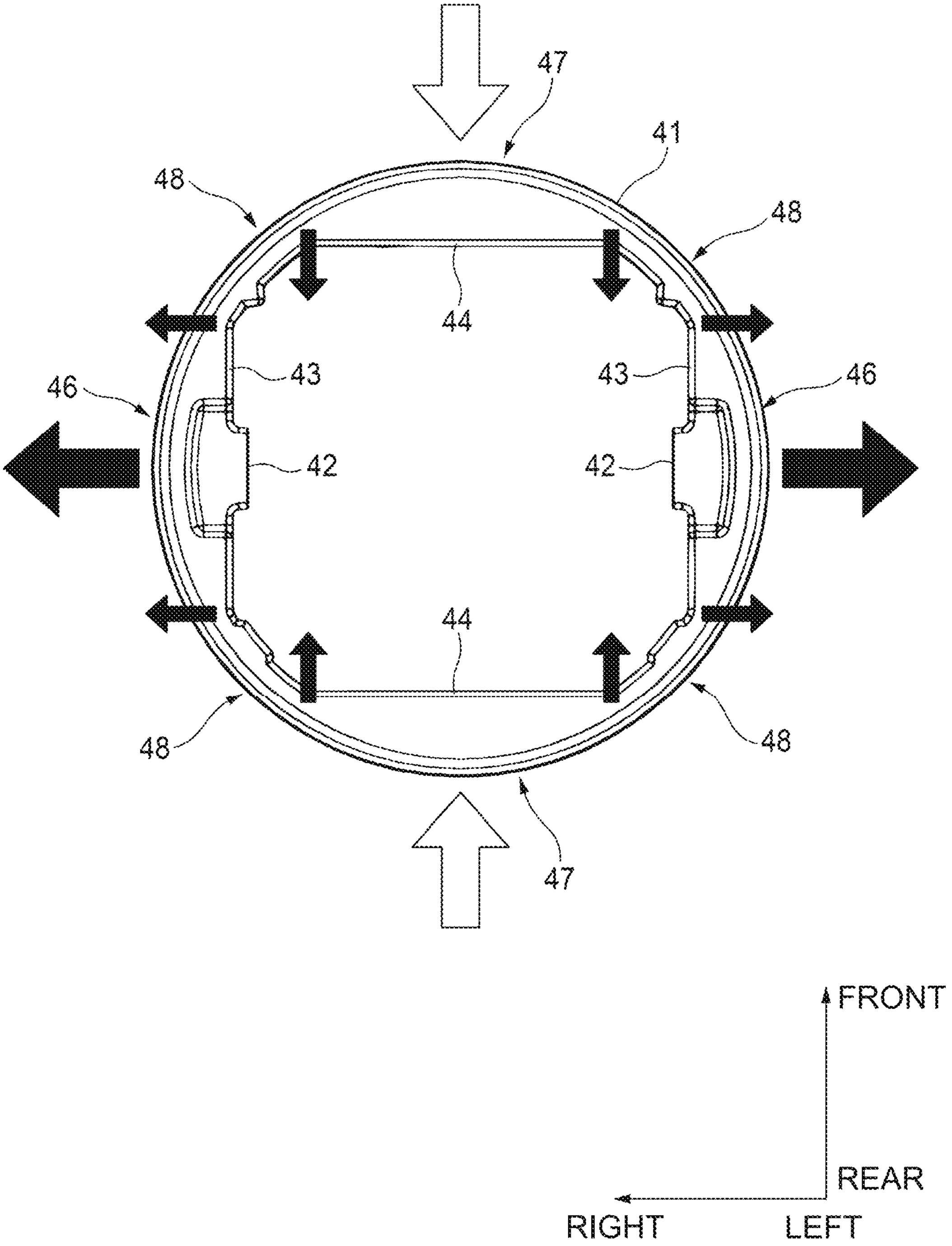
FIG. 8 is a diagram corresponding to FIG. 5 for explaining a deformation state of the front holder when a pair of operating portions is operated in the front holder.

Therefore, as shown in FIG. 8, due to the difference in rigidity between the operating portion 47 and the connecting portion 48, when the pair of operating portions 47 are displaced toward each other in the front-rear direction (radial direction) (see white arrows in FIG. 8), an external force in the circumferential direction is exerted from the pair of operating portions 47 to the four connecting portions 48 while the shape of the pair of operating portions 47 is substantially maintained. Due to the difference in rigidity between the locking portion 46 and the connecting portion 48, the pair of locking portions 46 are displaced away from each other in the left-right direction (radially outward) due to the above-described external force while the shape of the pair of locking portions 46 is substantially maintained (see thick black arrows in FIG. 8), and the four connecting portions 48 curve corresponding to the displacement of the pair of operating portions 47 and the pair of locking portions 46. Functions and effects of such deformation and displacement will be described later.

The front holder 40 is inserted from above into the fitting portion 12 to which the packing 30 is attached, and is attached to the outer periphery of the fitting portion 12 so that a lower edge portion thereof covers an outer periphery of the upper edge portion 32 of the packing (see FIGS. 3 and 4). When the front holder 40 is attached to the fitting portion 12 as shown in FIG. 4, by engaging the pair of engaging projections 42 of the front holder 40 with the through holes of the pair of flat plate-like portions 18 of the fitting portion 12 of the housing 10, the front holder 40 is prevented from coming off (upwardly) from the fitting portion 12. The lower edge portion of the front holder 40 is adjacent to the packing 30 and covers the outer periphery of the upper edge portion 32 of the packing 30, thereby preventing the packing 30 from coming off (upwardly) from the fitting portion 12.

As shown in FIG. 3, the pair of operating portions 47 (more specifically, the first rib portions 44) of the front holder 40 are arranged adjacently on the outside of the upper edge portion of the pair of locking frame portions 19 of the fitting portion 12, respectively, with a slight gap in the front-rear direction in between. Effects of providing such a gap will be described later.

Next, the inner housing 50 will be described. The inner housing 50 is a resin molded product, and has a function of defining an opening into which a mating connector (not shown) of the mating part is inserted, a function of holding the terminals 6, a function of aligning the terminals 6 with mating terminals (not shown) provided on the mating part (not shown) (so-called alignment function), and the like. As shown in FIG. 2, the inner housing 50 has a substantially rectangular cylindrical shape extending in the up-down direction. The substantially rectangular outer shape of the inner housing 50 when viewed in the up-down direction corresponds to the shape of the upper end portion of the fitting portion 12 (see FIG. 2). An upper end opening 51 of the inner housing 50 functions as an opening into which the mating connector of the mating part is inserted.

A pair of locking projections 52 are formed on a pair of side surfaces of the inner housing 50 facing with each other in the front-rear direction, respectively, as shown in FIG. 2. That is, the pair of locking projections 52 are arranged at positions corresponding to the pair of operating portions 47 of the front holder 40 in the circumferential direction of the inner housing 50 (see FIG. 2). The pair of locking projections 52 are engaged with opening edges of the pair of locking frame portions 19 (see FIG. 2) of the fitting portion 12 of the housing 10 (see FIG. 3).

The inner housing 50 is inserted from above into the fitting portion 12 to which the packing 30 and the front holder 40 are attached, and disposed in a cylinder of the fitting portion 12. When the inner housing 50 is attached to the fitting portion 12, as shown in FIG. 3, by engaging the pair of locking projections 52 of the inner housing 50 with the opening edges of the pair of locking frame portions 19 of the fitting portion 12 of the housing 10, the inner housing 50 is prevented from coming off (upwardly) from the fitting portion 12.

Immediately before the engagement between the pair of locking projections 52 and the opening edges of the pair of locking frame portions 19 is completed, the pair of locking frame portions 19 are temporarily deformed to the outside (away from each other in the front-rear direction) by pressure from the pair of locking projections 52. In this regard, as described above, since the pair of operating portions 47 (first rib portions 44) are arranged with a slight gap outside the upper edge portions of the pair of locking frame portions 19, when the pair of locking frame portions 19 is temporarily deformed, the pair of locking frame portions 19 do not interfere with the pair of operating portions 47 (first rib portions 44). Therefore, the inner housing 50 can be smoothly attached to the fitting portion 12.

In this way, the pair of terminals 6 are inserted into the pair of terminal insertion holes 14 (see FIG. 4) of the housing 10 from below while the inner housing 50 is located inside the cylinder of the fitting portion 12. By engaging a pair of locking pieces 53 provided on the inner housing 50 with a pair of locking holes 6*a* provided on the pair of terminals 6, the pair of terminals 6 are fixed to the housing 10 with upper end portions thereof exposed inside the fitting portion 12 (see FIG. 4).

As described above, after the packing 30, the front holder 40, and the inner housing 50 are attached to the fitting portion 12, the front holder 40 may be required to be separated from the fitting portion 12 for purposes of replacing the packing 30, recycling the connector 1, and the like. In this case, it is desirable that the front holder 40 can be separated from the fitting portion 12 without using a dedicated tool or the like from the viewpoint of facilitating and efficiency improvement of the separation work.

In this regard, in the connector 1, in order to separate the front holder 40 from the fitting portion 12, the pair of operating portions 47 are pressed so as to be sandwiched in the front-rear direction so that the pair of operating portions 47 are displaced toward each other in the front-rear direction (see the white arrows in FIG. 8). As a result, as described above, by displacing the pair of locking portions 46 away from each other in the left-right direction (radially outward) (see the thick black arrows in FIG. 8), the engagement (see FIG. 4) between the pair of engaging projections 42 and the through holes of the pair of flat plate-like portions 18 of the fitting portion 12 is released, the front holder 40 becomes separable from the fitting portion 12. By pulling the front holder 40 upward from the fitting portion 12 while maintaining this state, the front holder 40 can be separated from the fitting portion 12 without using a dedicated tool or the like. As described above, since the pair of operating portions 47 (first rib portions 44) are arranged with a slight gap outside the upper edge portions of the pair of locking frame portions 19, work of displacing the pair of operating portions 47 toward each other can be performed without difficulty.

When the pair of operating portions 47 are displaced toward each other in the front-rear direction in order to separate the front holder 40 from the fitting portion 12, even if the pair of operating portions 47 (more specifically, the pair of first rib portions 44) contacts the upper edge portions of the pair of locking frame portions 19 of the fitting portion 12, since the pair of locking frame portions 19 are pressed by the pair of operating portions 47 and displaced toward each other in the front-rear direction, the separating work of the front holder 40 is not hindered. In this case, since an engaging margin of the engagement (FIG. 3) between the opening edges of the pair of locking frame portions 19 and the pair of locking projections 52 of the inner housing 50 increases, release of the engagement is prevented, and an effect of preventing erroneous separation of the inner housing 50 when the front holder 40 is separated is exerted.

Next, the pressing plate 80 will be described. The pressing plate 80 has a function of preventing the above-described cover (not shown) from coming off (that is, coming off downward) from the housing 10 and a function of fixing the connector 1 to the mating part. The pressing plate 80 is formed by subjecting a single metal plate to predetermined press process, bending process, and the like.

As shown in FIG. 1, the pressing plate 80 has a plate-like shape capable of covering an entire lower surface of the housing 10. The pressing plate 80 is provided with flange portions 81 at a plurality of locations (two locations in this example) that extend so as to protrude from the housing 10 when the pressing plate 80 is attached to the housing 10. A bolt insertion hole 82 is formed through each flange portion 81 in the up-down direction. Screw insertion holes (not shown) penetrating in the up-down direction are formed at a plurality of predetermined locations of the pressing plate 80.

The pressing plate 80 is attached to the housing 10 from below so as to cover the above-described cover (not shown) from below, so that the pressing plate 80 is fixed to the housing 10 by screwing a screw inserted through each screw insertion hole (not shown) into a corresponding female screw portion provided on the housing 10. By fixing the pressing plate 80 to the housing 10, the cover is prevented from coming off from the housing 10 (that is, coming off downward).

As described above, mounting of the connector 1 is completed, and the connector 1 shown in FIG. 1 is obtained. The mounted connector 1 is mounted to the mating part such that the fitting portion 12 is fitted to the fitted portion of the mating part, and is fastened and fixed to the mating part using a bolt (not shown) inserted through the bolt insertion hole 82 of the flange portion 81 of the pressing plate 80. The mating connector of the mating part is inserted into the fitting portion 12 of the connector 1 fixed to the mating part. As a result, mating terminals (female terminals) accommodated in the mating connector are electrically connected to the pair of terminals 6 located within the fitting portion 12.

Functions and Effects

As described above, according to the connector 1 according to the present embodiment, by externally fitting the hollow annular front holder 40 on the fitting portion 12 of the housing 10, the pair of locking portions 46 of the front holder 40 are engaged with the fitting portion 12. By displacing the pair of operating portions 47 of the front holder 40 toward each other in the radial direction, the locking portions 46 are displaced so that the engagement between the locking portions 46 and the fitting portions 12 is released. Therefore, the engagement between the fitting portion 12 of the housing 10 and the front holder 40 can be released without using a dedicated tool or the like.

Furthermore, the rigidity of the connecting portion 48 is lower than the rigidity of the locking portion 46 of the front holder 40, and the rigidity of the connecting portion 48 is lower than the rigidity of the operating portion 47 of the front holder 40. Due to the difference in rigidity between the operating portion 47 and the connecting portion 48, when the pair of operating portions 47 are displaced toward each other in the radial direction, an external force in the circumferential direction is applied from the operating portions 47 to the connecting portions 48 while the shape of the operating portions 47 is substantially maintained. Furthermore, due to the difference in rigidity between the locking portion 46 and the connecting portion 48, the locking portions 46 are displaced radially outward due to the above-described external force while the shape of the locking portions 46 is substantially maintained, and the connecting portions 48 bend corresponding to the displacement of the operating portions 47 and the locking portions 46. Due to such deformation and displacement, the engagement between the locking portions 46 and the fitting portions 12 is released.

Furthermore, the operating portions 47 of the front holder 40 include the rib portions 44 and 45 that protrude from the annular inner surface of the front holder 40 and extend along the axial direction and the circumferential direction of the front holder 40. The rib portions 44 and 45 make the operating portions 47 more difficult to deform than other portions (for example, the connecting portions 48), and increase the rigidity of the operating portions 47 as a whole. Furthermore, the locking portions 46 of the front holder 40 include the engaging projections 42 that protrude from the annular inner surface of the front holder 40 and the extending portions 43 that extend from the engaging projections 42 along the circumferential direction. The engaging projections 42 and the extending portions 43 make the locking portions 46 more difficult to deform than other portions (for example, the connecting portions 48), and increase the rigidity of the locking portions 46 as a whole.

Other Embodiments

The present disclosure is not limited to the above embodiment, and various modifications can be adopted within the scope of the present disclosure. For example, the present disclosure is not limited to the above-described embodiment, and may be appropriately modified, improved or the like. Additionally, materials, shapes, sizes, numbers, arrangement positions, or the like of constituent elements in the above-described embodiment are optional and are not limited as long as the present disclosure can be achieved.

In the above embodiment, the locking portion 46 of the front holder 40 is provided with the engaging projection 42 and the extending portion 43, but it may be possible to provide only the engaging projection 42 and not provide the extending portion 43. Similarly, the operating portion 47 of the front holder 40 is provided with the first rib portion 44 and the second rib portion 45, but it may be possible to provide only one of the first rib portion 44 and the second rib portion 45.

Furthermore, in the above embodiment, the pair of locking projections 52 of the inner housing 50 are arranged at the positions corresponding to the pair of operating portions 47 of the front holder 40 in the circumferential direction of the inner housing 50 (see FIG. 2). In contrast, the pair of locking projections 52 of the inner housing 50 may be arranged at positions not corresponding to the pair of operating portions 47 of the front holder 40 in the circumferential direction of the inner housing 50.

Here, first to third aspects of the embodiment of the connector 1 according to the present disclosure described above are summarized and listed briefly below.

According to a first illustrative aspect of the present disclosure, a connector (1) includes: a terminal fitting (6); an electric wire (2, 3) connected to the terminal fitting (6); a housing (10) including a cylindrical wall portion (12) that accommodates the terminal fitting (6) and is provided with a location to be fitted with a mating part; a seal member (30) disposed to surround an outer periphery of the cylindrical wall portion (12); a front holder (40) having a hollow annular shape, being configured to prevent the seal member (30) from coming off from the cylindrical wall portion (12) and attached to the cylindrical wall portion (12) to surround the outer periphery of the cylindrical wall portion (12). The front holder (40) includes: a pair of first locking portions (46) arranged to face with each other in a radial direction of the front holder (40) and engageable with the cylindrical wall portion (12); and a pair of operating portions (47) arranged to face with each other in the radial direction at positions different from the pair of first locking portions (46). The connecter (1) is configured such that: in a state where the front holder (40) is fitted externally on the cylindrical wall portion (12), the pair of first locking portions (46) is engaged with the cylindrical wall portion (12); and in response to an operation of displacing the pair of operating portions (47) to approach with each other in the radial direction, the pair of first locking portions (46) is displaced to release an engagement between the front holder (46) and the cylindrical wall portion (12).

According to the connector having the configuration in the above first aspect, the hollow annular front holder is externally fitted on the cylindrical wall portion that accommodates the terminal fitting, so that the pair of first locking portions of the front holder is engaged with the cylindrical wall portion. The seal member is prevented from coming off by the front holder. By displacing the pair of operating portions of the front holder toward each other in the radial direction, the first locking portions are displaced so that the engagement between the first locking portions and the cylindrical wall portion is released. Therefore, the engagement between the cylindrical wall portion of the housing and the front holder can be released only by, for example, performing such a releasing operation manually by an operator, without using a dedicated tool or the like.

According to a second illustrative aspect of the present disclosure, the front holder (40) includes a connecting portion (48) disposed to connect between the first locking portions (46) and the operating portions (47), the connecting portion (48) being adjacent to the first locking portions (46) and the operating portions (47) in a circumferential direction of the front holder (40). A rigidity of the connecting portion (48) is lower than a rigidity of the first locking portions (46), and the rigidity of the connecting portion (48) is lower than a rigidity of the operating portions (47).

According to the connector having the configuration in the above second aspect, the rigidity of the connecting portion is lower than the rigidity of the first locking portion of the front holder, and the rigidity of the connecting portion is lower than the rigidity of the operating portion of the front holder. Due to the difference in rigidity between the operating portion and the connecting portion, when the pair of operating portions are displaced toward each other in the radial direction, an external force in the circumferential direction is applied from the operating portions to the connecting portions while the shape of the operating portions is substantially maintained. Furthermore, due to the difference in rigidity between the first locking portion and the connecting portion, the first locking portions are displaced radially outward due to the above-described external force while the shape of the first locking portions is substantially maintained, and the connecting portions bend corresponding to the displacement of the operating portions and the first locking portions. Due to such deformation and displacement, the engagement between the first locking portions and the cylindrical wall portion is released.

According to a third illustrative aspect of the present disclosure, the operating portions (47) include a rib portion (44, 45) protruding from an annular inner surface of the front holder (40) and extending along at least one direction of an axial direction and a circumferential direction of the front holder (40), and the first locking portions (46) include an engaging projection (42) projecting from the annular inner surface. And, the first locking portions (46) may further include an extending portion (43) extending along the circumferential direction from the engaging projection (42).

According to the connector having the configuration in the above third aspect, the operating portions of the front holder include the rib portions that protrude from the inner surface of the front holder and extend along the axial direction and the circumferential direction of the front holder. The rib portions make the operating portions more difficult to deform than other portions (for example, the connecting portions), and increase the rigidity of the operating portions as a whole. Furthermore, the first locking portions of the front holder include the engaging projections that protrude from the annular inner surface of the front holder and the extending portions that extend from the engaging projections along the circumferential direction. The engaging projections and the extending portions make the first locking portions more difficult to deform than other portions (for example, the connecting portions), and increase the rigidity of the first locking portions as a whole. Therefore, through the deformation and displacement described above when the release operation described above is performed, the engagement between the first locking portions and the cylindrical wall portion is released.

According to another aspect of the present disclosure, the connector 1 may have the following features.

The connector (1) according to any one of the above first to third aspects, further includes: an inner housing (50) disposed within a cylinder of the cylindrical wall portion (12), in which the inner housing (50) includes a second locking portion (52) engageable with the cylindrical wall portion (12) at a position corresponding to the operating portion (47) of the front holder (40), and when the operating portion (47) of the front holder (40) is operated to release the engagement with the first locking portion (46), the operating portion (47) presses the cylindrical wall portion (12) radially inward, thereby prevent releasing of the engagement between the second locking portion (52) and the cylindrical wall portion (12).

According to the connector having the above configuration, the inner housing is disposed in the cylinder of the cylindrical wall portion of the housing. When the front holder is separated from the cylindrical wall portion, the operating portion of the front holder is operated (that is, displaced radially inward), so that the operating portion presses the cylindrical wall portion radially inward. This pressing prevents the releasing of the engagement between the second locking portion of the inner housing and the cylindrical wall portion. Therefore, it is possible to avoid erroneous separation of the inner housing when the front holder is separated.

According to the connector of the present disclosure, by externally fitting the hollow annular front holder on the cylindrical wall portion that accommodates the terminal fitting, the pair of first locking portions of the front holder are engaged with the cylindrical wall portion. The seal member is prevented from coming off by the front holder. By displacing the pair of operating portions of the front holder toward each other in the radial direction, the first locking portions are displaced so that the engagement between the first locking portions and the cylindrical wall portion is released. Therefore, for example, the engagement between the cylindrical wall portion of the housing and the front holder can be released only by performing such a releasing operation manually by an operator. The cylindrical wall portion of the housing only needs to have a shape that can be regarded as a cylindrical shape as a whole, and may include structures of locking projections, locking grooves and through holes for the engagement with the front holder, and slits for flexibly adjusting these structures. In this way, the present disclosure can provide a connector in which the front holder can be separated without using a dedicated tool or the like.

What is claimed is:

1. A connector, comprising:

a terminal fitting;

an electric wire connected to the terminal fitting;

a housing including a cylindrical wall portion that accommodates the terminal fitting and is provided with a location to be fitted with a mating part;

a seal member disposed to surround an outer periphery of the cylindrical wall portion;

a front holder having a hollow annular shape, being configured to prevent the seal member from coming off from the cylindrical wall portion and attached to the cylindrical wall portion to surround the outer periphery of the cylindrical wall portion, wherein the front holder includes:

a pair of first locking portions arranged to face with each other in a radial direction of the front holder and engageable with the cylindrical wall portion; and a pair of operating portions arranged to face with each other in the radial direction at positions different from the pair of first locking portions; and when the front holder is fitted externally on the cylindrical wall portion and the pair of first locking portions is engaged with the cylindrical wall portion, displacing the pair of operating portions to approach with each other in the radial direction causes the pair of first locking portions to disengage from the cylindrical wall portion and release the front holder from the housing.

2. The connector according to claim 1, wherein the front holder includes a connecting portion disposed to connect between the first locking portions and the operating portions, the connecting portion being adjacent to the first locking portions and the operating portions in a circumferential direction of the front holder; and a rigidity of the connecting portion is lower than a rigidity of the first locking portions, and the rigidity of the connecting portion is lower than a rigidity of the operating portions.

3. The connector according to claim 1, wherein the operating portions include a rib portion protruding from an annular inner surface of the front holder and extending along at least one direction of an axial direction and a circumferential direction of the front holder, and the first locking portions include an engaging projection projecting from the annular inner surface.

4. The connector according to claim 3, wherein the first locking portions further include an extending portion extending along the circumferential direction from the engaging projection.

5. The connector according to claim 1, further comprising:

an inner housing disposed in a cylinder of the cylindrical wall portion, wherein the inner housing includes a pair of second locking portions engageable with the cylindrical wall portion at positions corresponding to the pair of operating portions of the front holder, and the displacing the pair of operating portions to approach with each other in the radial direction is configured to restrain the pair of second locking portions from disengaging from the cylindrical wall portion by pressure from the pair of operating portions inward in the radial direction.

* * * * *